US008098187B1

(12) United States Patent
Lynch et al.

(10) Patent No.: US 8,098,187 B1
(45) Date of Patent: Jan. 17, 2012

(54) WIDE FIELD OF VIEW MILLIMETER WAVE IMAGER

(75) Inventors: Jonathan J. Lynch, Oxnard, CA (US); James H. Schaffner, Chatsworth, CA (US); Phillip H. Lawyer, Thousand Oaks, CA (US); Daniel F. Sievenpiper, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 12/852,316

(22) Filed: Aug. 6, 2010

Related U.S. Application Data

(62) Division of application No. 11/008,716, filed on Dec. 8, 2004, now Pat. No. 7,796,080.

(51) Int. Cl.
*G01S 13/89* (2006.01)
(52) U.S. Cl. ......... 342/22; 342/11; 342/179; 343/911 L
(58) Field of Classification Search ...... 342/22
See application file for complete search history.

(56) References Cited

U.S. PATENT DOCUMENTS

| | | | | | |
|---|---|---|---|---|---|
| 2,682,235 | A | | 6/1954 | Fuller | 108/1 |
| 3,618,090 | A | * | 11/1971 | Garrison | 342/147 |
| 3,697,998 | A | * | 10/1972 | Schaufelberger | 343/754 |
| 4,114,162 | A | * | 9/1978 | Wild | 343/754 |
| 4,146,895 | A | * | 3/1979 | Wild | 343/754 |
| 4,217,590 | A | * | 8/1980 | Wild et al. | 343/754 |
| 4,488,156 | A | * | 12/1984 | DuFort et al. | 343/754 |
| 4,825,216 | A | * | 4/1989 | DuFort | 342/376 |
| 5,047,776 | A | * | 9/1991 | Baller | 342/52 |
| 6,141,034 | A | * | 10/2000 | McCutchen | 348/36 |
| 6,208,288 | B1 | * | 3/2001 | Shoucri et al. | 342/179 |
| 6,292,134 | B1 | * | 9/2001 | Bondyopadhyay | 342/374 |
| 6,594,582 | B1 | * | 7/2003 | Quinn | 701/213 |
| 6,867,741 | B2 | | 3/2005 | Schaffner et al. | 343/753 |
| 7,796,173 | B2 | * | 9/2010 | Lettvin | 348/294 |
| 2003/0043086 | A1 | | 3/2003 | Schaffner et al. | 343/909 |

OTHER PUBLICATIONS

Al Salameh, M.S., et al., "Coplanar-Waveguide-Fed-Slot-Coupled Rectangular Dielectric Resonator Antenna," IEEE Transactions on Antennas and Propagation, vol. 50, No. 10, pp. 1415-1419 (Oct. 2002).
Bekefi, G., et al., "A Homogenous Dielectric Sphere As a Microwave Lens," Canadian Journal of Physics, vol. 34, pp. 790-803 (1956).
Hadyl, W.H., et al., "Attenuation of Millimeterwave Coplanar Lines on Gallium Arsenide and Indium Phosphide Over the Range 1-60 GHz," IEEE MTT-S Digest, pp. 349-352 (1992).
Hecht, E., Optics, Addison-Wesley Publishing Company, Reading, Massachusetts. p. 422 and p. 424 (1988).
Hsia, R.P., et al., "Millimeter-Wave Schottky Diode Imaging Array Development," APPMC, vol. 1, pp. 1-9-1-12 (1993).

(Continued)

*Primary Examiner* — Thomas Tarcza
*Assistant Examiner* — Matthew M Barker
(74) *Attorney, Agent, or Firm* — Ladas & Parry

(57) ABSTRACT

An imager comprising a sphere of dielectric material and a geodesically configured substrate disposed adjacent said sphere. The geodesically configured substrate comprises a plurality of triangularly shaped elements, at least selected ones of the triangularly shaped elements having an array of detectors disposed thereon, the detectors in the array also being disposed adjacent the dielectric sphere for receiving and detecting incoming electromagnetic waves delivered via said sphere.

8 Claims, 7 Drawing Sheets

OTHER PUBLICATIONS

Morishita, H., et al., "Analysis of a Cavity-Backed Annular Slot Antenna with One Point Shorted," IEEE Transactions on Antennas and Propagation, vol. 39, No. 10, pp. 1472-1478 (Oct. 1991).

Qian, Y., et al., "Optimal Design of an Offset-Fed, Twin-Slot Antenna Element for Millimeter-Wave Imaging Arrays," IEEE Microwave and Guided Wave Letters, vol. 4, No. 7, pp. 232-234 (Jul. 1994).

Schoenlinner, B., et al., "Wide-Scan Spherical-Lens Antennas for Automotive Radars," IEEE Transactions on Microwave Theory and Techniques, vol. 50, No. 9, pp. 2166-2175 (Sep. 2002).

Schulman, J.N., et al., "SB-Heterostructure Millimeter-Wave Zero-Bias Diodes," 58th Device Research Conference, Denver, Colorado, pp. 57-58 (Jun. 19-Jun. 21, 2000).

Schulman, J.N., et al., "W-Band Direct Detection Circuit Performance With Sb-Heterostructure Diodes," IEEE Microwave and Wireless Components Letters, vol. 14, No. 7, pp. 316-318 (Jul. 2004).

Scrank, H., "A Luneberg-Lens Update," IEEE Antennas and Propagation Magazine, vol. 37, No. 1, pp. 76-79 (Feb. 1995).

Tomasic, B., et al., "A Geodesic Sphere Phased Array Antenna for Satelite Control and Communication," Presented at the URSI General Assembly Conference, Paper I38.0.9., 4 pages total (Jul. 15, 2002).

Uehara, K., et al., "Lens-Coupled Imaging Arrays for the Millimeter- and Submillimeter-Wave Regions," IEEE Transactions on Microwave Theory and Techniques, vol. 40, No. 5, pp. 806-811 (May 1992).

* cited by examiner

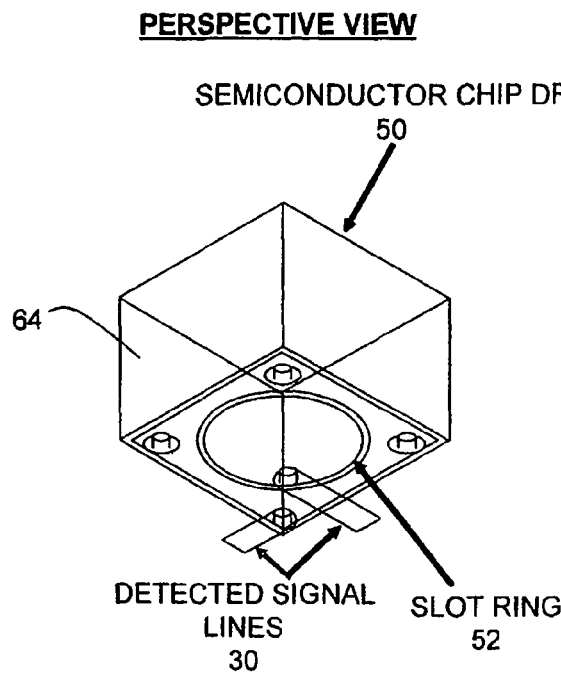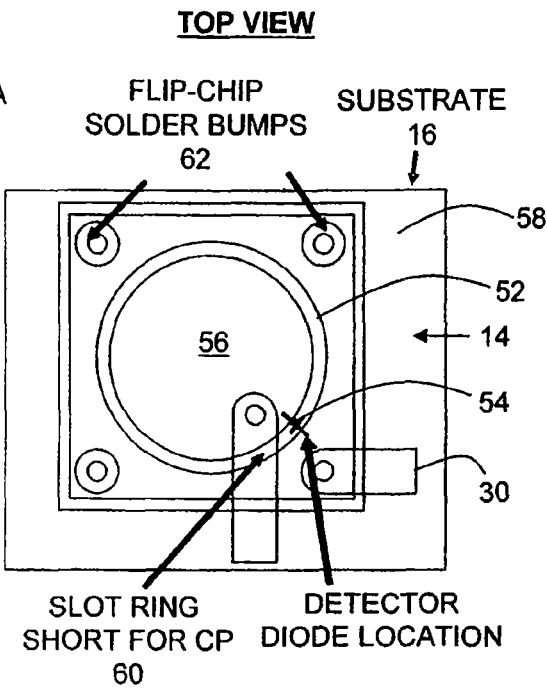
Figure 6a
Figure 6b

ANTENNA PATTERN

WIDE FIELD OF VIEW MILLIMETER WAVE IMAGER

CROSS-REFERENCE TO RELATED APPLICATIONS

This application is the divisional of U.S. patent application Ser. No. 11/008,716 filed on Dec. 8, 2004, the disclosure of which is incorporated herein by reference in its entirety.

TECHNICAL FIELD

Disclosed is a wide field of view millimeter wave imaging system and a method of assembling the same. Detector chips, each comprising a diode sensor and an integrated antenna, are attached to a two dimensional flexible multilayer printed circuit board. This flexible printed circuit board is then folded up into a geodesic structure that fits around, and contacts the spherical lens through mechanically stabilized contact points.

BACKGROUND

Current millimeter wave imaging arrays mostly use convex lenses to focus an image onto a flat focal plane. The angular field of view is then limited to the amount of defocusing that can be tolerated away from the center of the focal plane. The presently disclosed technology shows how to practically assemble multiple focal planes around a spherical lens for a very wide angular field of view. In addition, the presently disclosed technology teaches how to use monolithically integrated diode and antenna detector chips that may be flip-chip attached to a folded hybrid printed circuit board to create a compact, three-dimensional imaging system with a wide field of view.

The millimeter wave imaging assembly described herein may be used in many different possible applications, including vehicle collision avoidance system for use in harsh weather (such as fog), wide angle imaging for aircraft landing systems, and battlefield and civil disaster imaging through clouds and smoke. Millimeter wave imaging is an aid to infrared and/or visible imaging systems when harsh environmental conditions obscure the shorter wavelength systems.

The prior art includes:

B. Schoenlinner, X. Wu, J. P. Ebling, G. V. Eleftheriades, and G. M. Rebiez, "Wide-Scan Spherical-Lens Antennas for Automotive Radars," *IEEE Trans. Microwave Theory Technique*, Vol. 50, No. 9, September 2002, pp. 2166-2175.

This paper describes a millimeter wave automotive radar that uses a spherical lens and an array of pick-up antennas that surround the lens. This system uses a spherical lens for focusing and printed circuit tapered slot antennas to receive the signal and channel it into a detector. The antenna array surrounds the lens in one diametric plane only, thus it would have to be physically scanned to receive signals from other planes and thus form an image. The presently disclosed technology utilizes a dielectric resonator antenna fabricated monolithically from the same substrate that has the detector diode. This allows a much denser fill of pixels and also allows us to produce an image from multiple diametric planes simultaneously.

J. H. Schaffner, J. J. Lynch, and D. F. Sievenpiper, "Antenna System and RF Signal Interference Abatement Method," Patent Application Publication US2003/0043086 A1, Mar. 6, 2003.

This published patent application includes a description of using a spherical lens surrounded by patch antenna elements to simultaneously focus on multiple GPS satellites over a very wide field of view. The major differences between that patent application and the present disclosure are:

The prior art does not need dense angular discrimination since the locations of the GPS satellites are frequently widely spread across the celestial field of view. The present disclosure shows how to densely pack detectors for a much finer angular resolution that is needed for imaging systems.

The prior art assumes that the antennas to which the signals are focused are separate from the lens and in fact stand off from the lens. In this disclosure we describe a single imaging system and method of assembly whereby the focal plane arrays are in intimate contact with the lens to form a very compact system.

B. Tomasic, J. Turtle, and S. Liu, "A geodesic sphere phased array antenna for satellite control and communications," presented at the URSI General Assembly 2002 Conference, Jul. 15, 2002, paper B8.0.9.

This paper describes the use of a geodesic dome to support a phased array antenna for wide field of view radar scanning. The difference between this report and the present disclosure is that the report describes a phased array antenna while we describe an imaging array. In the paper, the antenna elements radiate away from the spherical surface and each facet of the dome is fed through a corporate feed network. This disclosure is not directed to a phased array antenna, but rather relies on a dielectric lens to focus the point of an image.

Additional prior art documents include:

1. H. Schrank and J. Sanford, "A Luneburg Lens Update," *IEEE Antennas and Propagation Magazine*, Vol. 37, No. 1, February 1995, pp. 76-79.
2. G. Bekefi and G. W. Farnell, "A Homogeneous Dielectric Sphere as a Microwave Lens," *Canadian Journal of Physics*, Vol. 34, 1956, pp. 790-803.
3. R. P Hsia, S. Cheng, W. R Geck., C. W Domier. N. C., Luhmann, Jr.; "Millimeter-wave Schottky diode imaging array development," *Microwave Conference Proceedings, 1993. APMC '93., 1993 Asia-Pacific*, Vol. 1, 1993, pp. 9-12.
4. J. N. Schulman, D. H. Chow, C. W. Pobanz, H. L. Dunlap, and C. D. Haeussler, "Sb-heterostructure millimeter wave zero-bias diodes," *Device Research Conference 2000, Conference Digest, 58th DRC*, Jun. 19-21, 2000, pp. 57-58.
5. Yongxi, S. Iwata, and E. Yamashita, "Optimal design of an offset-fed, twin-slot antenna element for millimeter-wave imaging arrays," *Microwave and Guided Wave Letters*, Vol. 4, No. 7, July 1994, pp. 232-234.
6. K. Uehara, K. Miyashita, K.-I. Nasume, K. Hatakeyama, and K. Mizuno, "Lens-coupled imaging arrays for the millimeter- and submillimter-wave regions," *IEEE Trans. Microwave Theory Technique*, Vol. 40, No. 5, May 1992, pp. 806-811.
7. Eugene Hecht, Optics, Addison-Wesley Publishing Company, Reading, Mass., 1988, pg. 422.
8. R. Buckminster Fuller, "Building Construction," U.S. Pat. No. 2,682,235, June 1954.
9. W. H. Haydl, J. Braunstein, T. Kitazawa, M. Schlechtweg, P. Tasker, and L. F. Eastman, "Attenuation of Millimeter Wave Coplanar Lines on Gallium Arsenide and Indium Phosphide over the Range 1-60 GHz," *Digest of the 1992 IEEE MTT-S International Symposium*, 1992, pp. 349-352.
10. M. S. Al Saameh, Y. M. M Antar, and G. Seguin, "Coplanar-Waveguide-Fed Slot-Coupled Rectangular Dielectric Resonator Antenna," *IEEE Trans. Antenna Propag.*, Vol. 50, No. 10, October 2002, pp. 1415-1419.
11. H. Morishita, K. Hirasawa, and K. Fujimoto, "Analysis of a Cavity-Backed Annular Slot Antenna with One Point Shorted," *IEEE Trans. Antenna Propag*," Vol. 39, No. 10, October 2001, pp. 1472-1478.
12. J. N. Schulman, V. Kolinko, M. Morgan, C. Martin, S. Clark, J. Lovberg, S. Thomas III, J. Zinck, and Y. K. Boegeman, "W-Band Direct Detection Circuit Performance with Sb-Heterostructure Diodes," Submitted for publication to *IEEE Microwave and Wireless Components Letters*, October 2003.

BRIEF DESCRIPTION OF THE INVENTION

A millimeter wave imaging system assembly consists of a spherical dielectric lens and multiple detector focal planes, bounded by triangles, arranged as a geodesic structure surrounding and approximately conforming to the lens.

Compact circuit geometry of a geodesic structure panel containing an array of densely placed monolithic detector chips comprised of diodes and integrated antennas. These panels are replicated to form a geodesic structure around the dielectric lens sphere. The detector chips are flip-chip attached to the substrate board which comprises the geodesic panels.

A single flexible multilayer printed circuit board which is fabricated so that the detector chips and sensor cables can be attached while the board is flat, and then can be readily folded into a geodesic structure that is placed around the lens such that the center of each triangle of the geodesic structure is at the focal point of the lens.

A flexible multiple line sensor cable that is solder attached to the outside (the side away from the lens) of a selected panel of the geodesic structure. The purpose of the cable is to be able to individually address each detector chip from a sensor integrator and controller.

BRIEF DESCRIPTION OF THE DRAWINGS

FIGS. 6a and 6b are perspective and plan view depictions of a detector chip flip-chip attached to the substrate.

DETAILED DESCRIPTION

Figure 1:
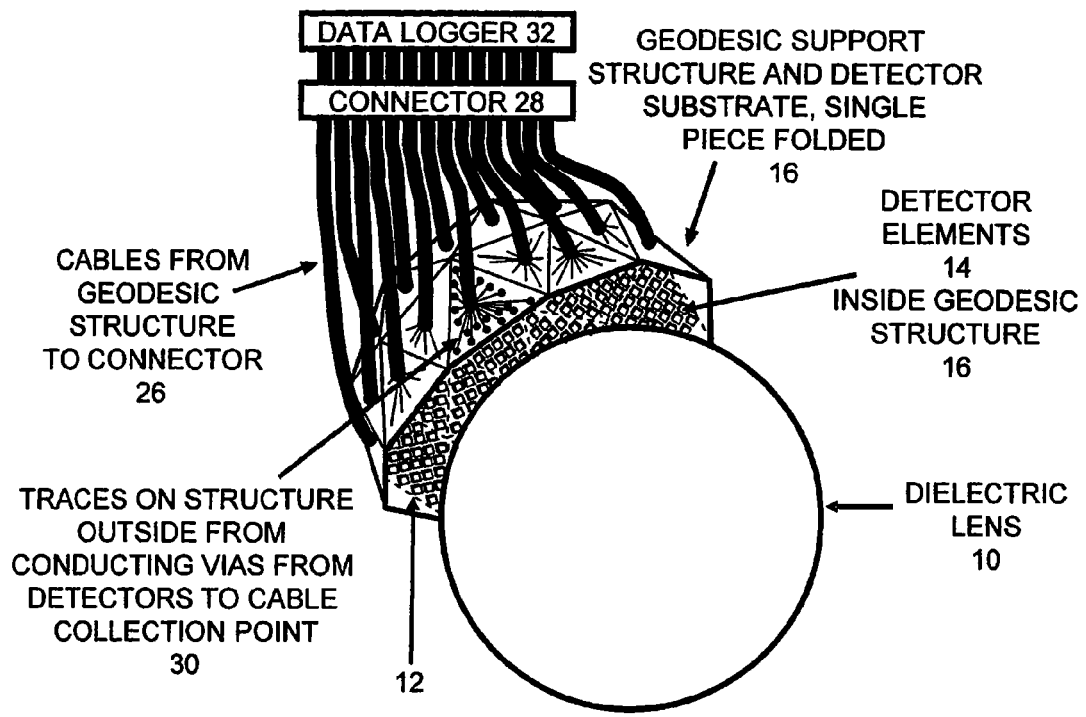
FIG. 1 shows a three-dimensional millimeter wave imaging system for wide field of view.

A wide field of view millimeter wave imaging assembly is shown in FIG. 1. In this figure a solid dielectric lens 10 is used to focus an electromagnetic wave incident on the sphere to a point on the opposite side of the sphere. A Luneburg lens has a radially varying dielectric constant so that the focal point coincides with the back-side of the sphere surface along the direction of incidence. Ideally a Luneberg lens is used. However, a Luneberg lens is difficult to fabricate due to its continuously varying dielectric constant. So, while a Luneburg lens might be preferred from a theoretical point of view, a solid dielectric sphere would be preferred in many applications since it is easier, and hence less costly, to fabricate. So a solid dielectric lens 10, which may be of the Luneburg lens type, is used to focus the electromagnetic wave incident on the sphere. A detector chip placed at this point would pick up the signal from which the image is to be formed without distortion. A homogeneous dielectric sphere of dielectric constant of 4.0 will focus most paraxial rays to a point at the backside of the sphere 10. Although there will be some distortion of plane waves from spherical aberrations, the homogeneous dielectric sphere makes a reasonably good, and inexpensive, millimeter wave lens. In general, the distance, R that the focal point is from the center of the sphere is given by $$R = \frac{D}{4} \frac{\sqrt{\varepsilon}}{\sqrt{\varepsilon}-1},$$

where D is the diameter of the sphere and $\varepsilon$ is the dielectric constant. For fused silica, $\varepsilon$ is 3.8 which puts the focal point at a distance approximately 1.03*D/2, or slightly beyond the sphere's surface. For Duopt® Delrin® brand acetal plastic the dielectric constant is 3.7 which puts the focal point at 1.04*D/2 beyond the sphere's surface. A reasonable range of relative dielectric constant for a homogenous spherical lens is roughly between 3 and 6. For a Luneburg lens the relative dielectric constant varies from 2 (at its center) to 1 at its outer surface.

Figure 6:
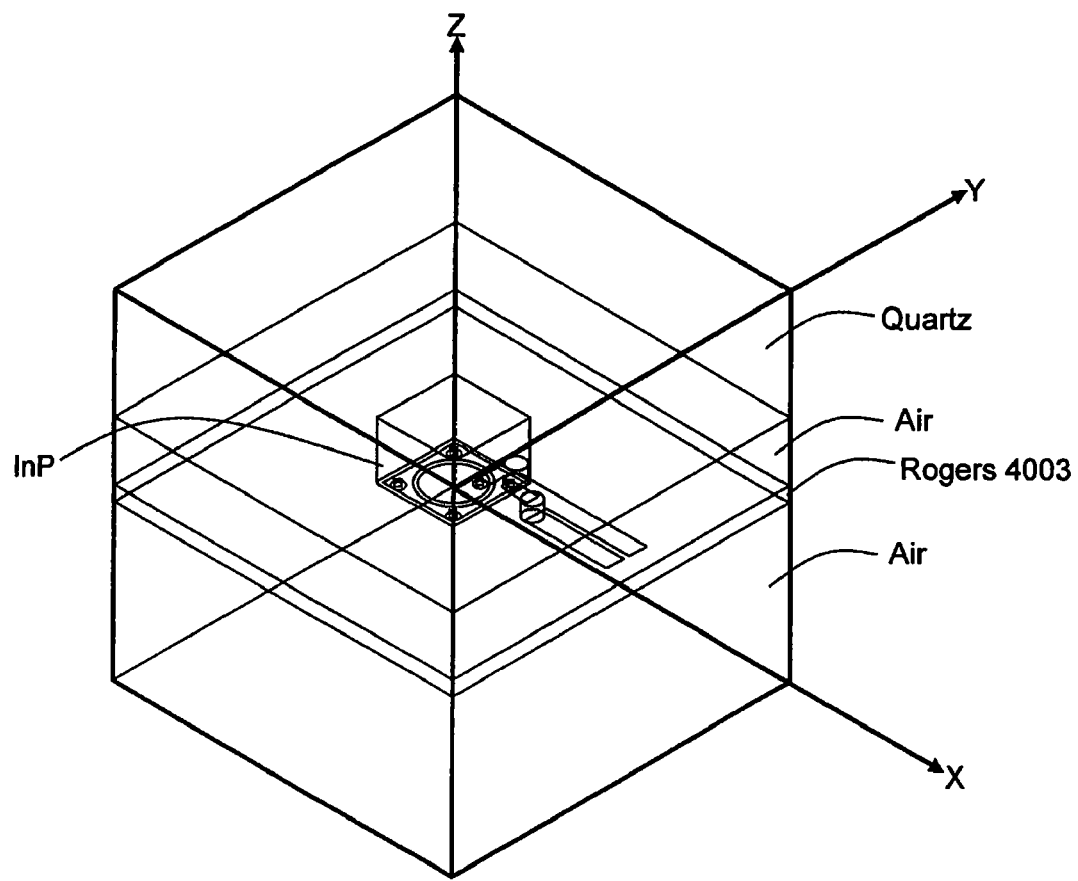
FIG. 6 depicts the HFSS model for the dielectric resonator antenna.

An array 12 of millimeter wave detectors 14 is placed around the sphere 10, covering up to $2\pi$ steradians, i.e. a hemisphere, to capture the RF signals coming from waves impinging upon the sphere and focused at points behind the sphere along the direction of propagation. A detector 14 consists of a millimeter wave power detection device, such as a Schottky or backward diode, and an antenna to efficiently funnel the signal to the detection device. In FIG. 6a semiconductor chip DRA 50 serves as the antenna. The limit of resolution is defined as the distance apart that two incoherent point sources can be focused to separate images. It is given by:

$$\Delta l = 1.22 f \lambda / D,$$

where $\Delta l$ is the distance between the two images on the focal plane, D is the aperture dimension of the focusing lens or reflector, f is the focal distance, and $\lambda$, is the wavelength. For the case of focusing to the surface of the spherical lens of diameter D, f is equal to D/2 so that the resolution limit is $0.61\lambda$. This defines the nominal spacing between detectors 14.

The detectors are supported by a geodesic structure 16 (see also FIG. 5) comprising a single substrate material which has been folded to create the three-dimensional structure. The geodesic structure is comprised of flat triangular regions 18 arranged to approximate a sphere. As shown in FIG. 1, the detectors 14 are arranged in a triangular array on each triangle 18 where it is desired to have an imaging pixel. The detectors are assembled onto substrate 16 at the locations such that when the substrate 16 is folded into a geodesic structure, the detectors are located around the sphere as shown in FIG. 1. It may be desirable to provide the sphere with flattened surfaces facing the geodesic structure.

Each triangle 18 of the geodesic structure 16 approximates a focal plane (approximate because the true focal points of a sphere sweep out a spherical surface). Discrete detectors 14 can be assembled onto the substrate 16 and electrically connected to bond pads by wirebonding or by flip-chip soldering, or a triangular array of monolithic detectors can be bonded to the substrate 16. The substrate material 16 should be thin enough to readily fold into geodesic shape (or at least thin enough along the fold lines 22); typical substrate materials used for flexible printed circuits are polyimide films such as Dupont Kapton® or polyesters such as Dupont Mylar®. And such materials may be used, for example, as the substrate 16.

The detected image signals, typically DC, are conducted through via holes 24 (see also FIG. 3) in the substrate 16 to the convex side of the geodesic structure 16. The signals are then routed on the convex side of the structure to a cable 26 preferably having enough lines to carry the detected signals from each detector in an array of detectors away from the geodesic structure to a collection connector 28. Each triangle 18 that contains detectors may have an attached cable as shown in FIG. 1. Lines 30 that route the detected signal from each conductive via hole 24 are then replicated at each triangle 18. An alternative technique, not shown, is to have a single cable connect to signal lines emanating from a number of triangles. In this case, the substrate may need to have multiple layers to route the increased number of lines to a single cable. The lines from the cable are brought to a connection point and then the signals are brought into a data logging network 32 to process the image data from all of the detectors 14.

Figure 2:
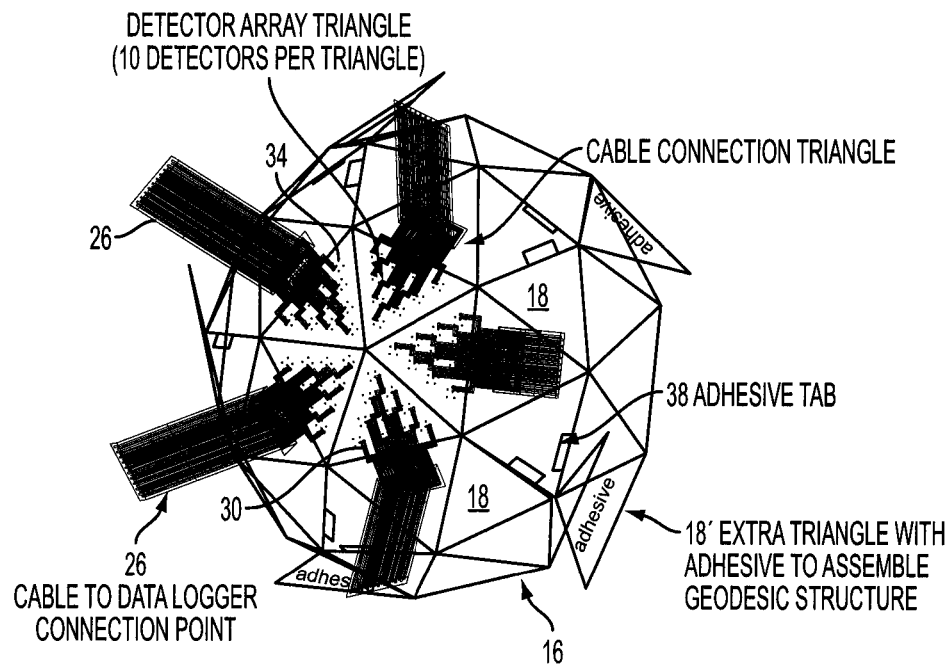
FIG. 2 depicts an embodiment of a millimeter wave imaging system showing a geodesic substrate structure folded up with five triangles containing detector arrays.

An embodiment for a 94 GHz imaging assembly is shown in FIG. 2. For this case the lens 10, which is not shown in FIG. 2, is a 31 mm diameter sphere of homogeneous Delrin®. A geodesic structure of forty triangles 18 is used to cover this lens 10. An array of 12 detectors 14 fill each triangle, but in this view only the lines 30 and cables 26 can be seen, since the detectors themselves are located on the concave side of the geodesic structure 18. While the detectors cannot be seen in FIG. 2, their bond pad locations 34 are depicted. The detectors 14 will be described in greater detail later.

Two conductive lines 30 lead from each detector bond pad (one for signal and one for ground) through a conductive via hole 24 and on to an adjacent triangle 18. Because there are so many detector output pairs that need to run to a connector 35, the connector 35 is relatively large and it is difficult to place the connector on the same triangle as the detectors 14. To get around this obstacle, the detector signals may be routed to adjacent triangles that do not contain detectors (in a preferred embodiment) where there is plenty of room for the connector 35. If there are many contiguous triangles with detectors 14, the routing of the signals becomes more difficult. At the adjacent triangle 18 the lines 30 are terminated in an array for attachment to cables 26 which bring the detected signals from the triangle to a central connection point 28 for the data logger 32 (as shown in FIG. 1). Five pairs of triangles 18' overlie each other when the substrate is assembled into a geodesic configuration. These pairs of triangles 18' are adhesively or cohesively bonded to one another, and adhesive/cohesive covered tabs 38 are preferably included to permanently assemble the geodesic structure.

Figure 3:
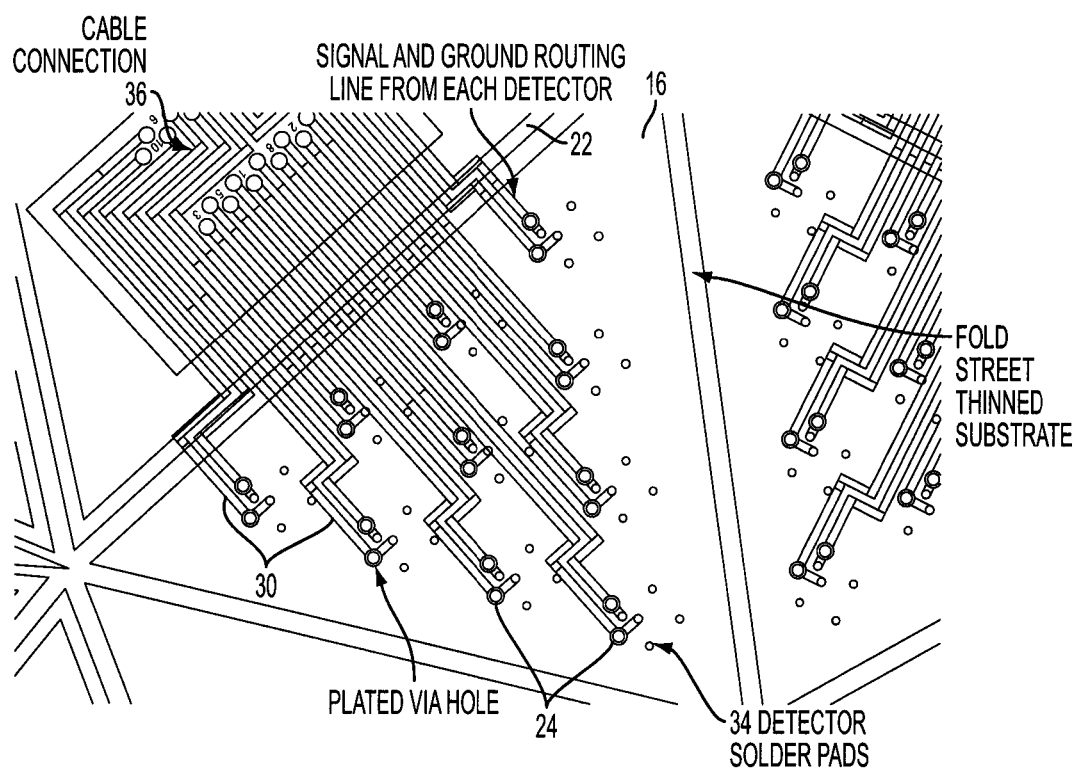
FIG. 3 is a close-up plan view of circuit layout of a triangle on the geodesic structure.

A close up of the substrate circuit is shown in FIG. 3. In this figure the substrate 16 is depicted as being transparent so that metal lines, pads, and vias can be illustrated on both sides of the substrate simultaneously. The lines on the concave side are shown with dashed outlines to differentiate them from the lines on the exterior (convex) side of the structure. The substrate and metal parts can be fabricated on polyimide, such as Kapton®, for example, using commercially available techniques. Detector chips 14 preferably are flip-chipped mounted on the inside surface of the substrate 16 (facing the dielectric spherical lens 10). There are preferably five detector solder pads for each detector, which includes two that are connected to signal lines 30 which go to two conducting via holes 24 for each detector. On the outside surface of the substrate 14 (the side away from the lens 10), metal signal routing traces 30 preferably terminate at cable connection pads 36 located on an adjacent triangle 18 adjacent connector 35. Separate cables 26 may be soldered to these connector pads 36 to route the signals away from the imaging system to a data logging network 32 for signal processing. Also shown in FIG. 3 are streets where the substrate is thinned for folding the flat structure into the geodesic structure to fit around the lens.

An embodiment of the cable that will attach to one of the triangles 18 with cable connection pads 36 can be made from Kapton® brand polyimide and copper traces 30. A ribbon cable 26 is preferably fabricated for each triangle 18 that is to be connected to the data logging processor 32 (FIG. 1). Since only DC or very low frequency signals will be routed to the processor, each cable 26 can be terminated with a low-cost commercially available connector, such as a ZIF® brand connector.

Figure 4:
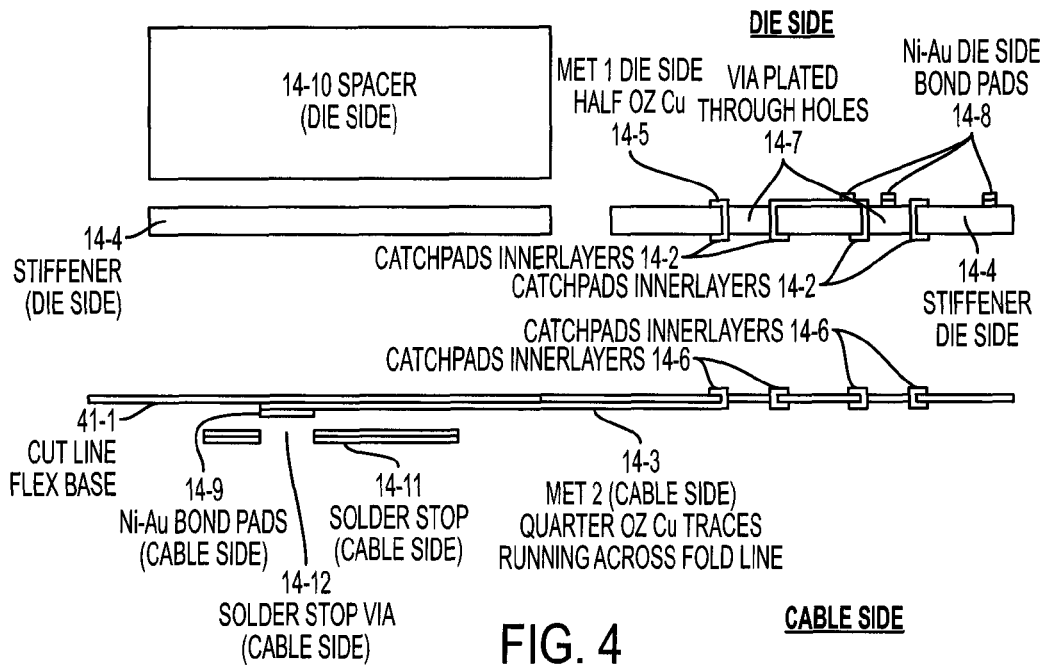
FIG. 4 depicts a profile of the geodesic dome circuit structure showing the substrate and metal layers that make up the circuit.

A profile of the geodesic circuit substrate which shows an example of the fabrication layers for this embodiment is shown in FIG. 4. In that figure, the die side refers to the side of the structure 16 closest to the dielectric lens 10 to which the detector die (semiconductor chip DRA 50) is attached. The cable side is the outside surface of structure 16 away from the lens 10. The layers are identified as follows:

14-1 CUT-LINE FLEX BASE: this is preferably formed from Kapton® 0.001" thick. It is preferably the only layer that is present over the entire geodesic structure.

14-2 CATCHPAD INNERLAYER: this layer contains copper pads that connect plated vias from the STIFFENER DIESIDE layer to the CUT-LINE FLEX BASE.

14-3 MET2: This layer contains copper traces on the outside (cable side) of the structure for routing signals from the vias to connector pads.

14-4 STIFFENER DIESIDE: This is preferably formed from Kapton® 0.003" thick. It is the main substrate layer to which the detector die chip is attached.

14-5 MET1 DIESIDE: This layer has copper traces to take the signal from the detector to conductive via holes to bring the detected signal to the cable side of the structure.

14-6 CATCHPAD INNERLAYER: This layer contains copper pads which connects plated vias through the CUT-LINE FLEX BASE to the cable side of the structure. The pads align with the pads on the CATCHPAD INNERLAYER 14-2.

14-7 VIA PLATED THROUGH HOLES: This layer is fabricated with plated via holes to route the signals from the die side to the cable side.

14-8 Ni—Au DIE SIDE BONDPADS: This layer contains nickel-gold metal pads that serve as bonding pads for flip-chip soldering of the detector die.

14-9 Ni—Au CABLE SIDE BONDPADS: Same as layer 14-8, except the pads are on the cable side and are for attaching the cable 26.

14-10 SPACER DIESIDE: This layer is preferably formed of 0.023" thick Kapton® and forms a frame around each triangle 18. It is the top of this spacer that is attached to the sphere 10 and is used to ensure proper seating of the geodesic structure around the sphere 10.

14-11 SOLDER STOP: This is preferably formed of 0.001" thick Kapton® and is used to contain the solder when it flows during the cable attachment process.

14-12 SOLDER STOP VIA: This layer is a cut-out of the SOLDER STOP layer to provide access the Ni—Au CABLE SIDE BONDPADS for attaching the cables.

Figure 5:
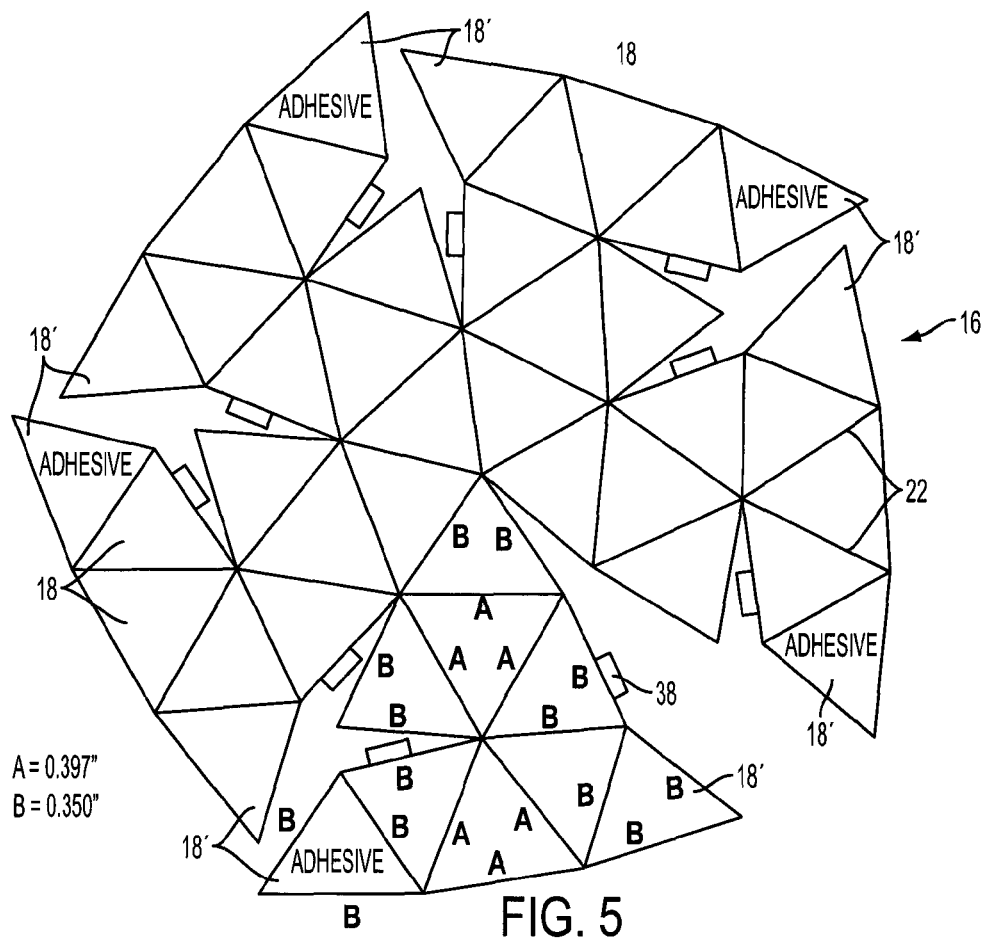
FIG. 5 depicts the geodesic structure laid out flat, with only two of the substrate layers being shown for clarity.

FIG. 5 shows the geodesic structure 16 of this embodiment when it is flat, before folding and assembling into a geodesic structure. The triangles 18 and tabs 38 can be mapped onto the folded structure shown in FIG. 2. Also, for this embodiment, the triangles 18 are isosceles triangles with base dimensions of 9.5717 mm (0.37684") and side dimensions of 8.4644 mm (0.33324"). The structure substrate 16 should be cut into this shape depicted to be properly folded to the structure 16 of FIG. 2.

The detector 14 will now be described in greater detail. The disclosed millimeter wave detector 14 contains an RF sensing device 54 (see FIG. 6b), which can be a diode such as a Schottky diode or a backward diode. These diodes 54 are preferably grown on epitaxial layers on a base semiconductor material such as a semi-insulating GaAs or InP chip. In this embodiment, advantage is taken of the low-loss characteristics at high frequencies of GaAs and InP to create a Dielectric Resonator Antenna (DRA) 50. A drawing of an embodiment of such an antenna is shown in FIGS. 6a and 6b.

A slot ring 52 is preferably used to feed the DRA 50, although other types of feed structures could be used, such as linear slots or metallic patches. The slot ring 52 is preferably fabricated from metal deposited on the DRA chip 50, and for GaAs and InP chips the preferred metal is gold. The detector diode 54 is preferably grown in the DRA 50 semiconductor and is located across the slot 52 such that the anode (for example) of the diode 54 contacts the inner metal circle 56 and the cathode (for example) of the diode 54 contacts the outer metal 58. The diode 54 could also be fabricated in the opposite polarity direction as well. One advantage of the slot ring feed antenna structure 52, 56, 58 is that the DRA 50 can respond to circular polarization by properly locating an RF short circuit 60 across the slot 52. The distance the short 60 is from the diode 54 is determined by the conjugate impedance match of the slot ring 52 and DRA 50 to the diode's impedance. In practice, the RF short circuit is preferably made from a relatively large capacitor, thus creating DC isolation across the slot 52 for the diode 54 to work properly. Fabricating the detector 14 to respond to RF circular polarization facilitates attachment of the chip 64 to the geodesic dome substrate 16 in that rotational alignment of the chip 64 can be based upon layout requirements rather than on the received RF polarization requirements. Also shown in FIG. 7b are the location of solder bumps 62 that connect the detector chip 64 to the geodesic substrate 16 and the two signal lines 30, located on the substrate, to bring the signal from the detector 14 to via holes 24 (shown in FIG. 3) to be routed to the cable connection arrays 36. The signal lines 30 are located very close to the short circuit to minimize parasitic coupling of the RF onto the lines 30.

An example of a detector 14 based upon fabrication with an InP chip substrate 56 was designed for 94 GHz operation and simulated using Ansoft Corporation's field simulation software HFSS®. A small signal equivalent circuit of the diode was used to determine the diode impedance at 94 GHz, which was calculated to be 10-j33.7Ω. This value was used to determine the dimensions of the DRA 50 and slot ring diameter, and to determine the position of the short circuit to provide optimum performance at 94 GHz. In the simulation, the diode 54 was replaced by a small source with impedance identical to the diode's impedance. A 1 pF capacitor was used as the RF short 60. Also, it was assumed in the simulation that the geodesic dome structure substrate 16 was 0.005" thick and that the top of the DRA 50 was attached to a fused silica (quartz) superstrate 0.040" thick (shown in FIG. 6). The modeling space was surrounded by a radiation boundary. The design parameters are given below:

InP chip dimensions: 0.027"×0.027"×0.020" (0.020" is the nominal thickness of an InP wafer)
   Slot ring inner radius: 0.0092"
   Slot width: 0.001"
   Slot short: located 15° around the slot ring from the diode.
   In addition it was assumed that the solder bumps held the detector chip 56 off of the substrate 16 by 0.001".

Figure 7A:
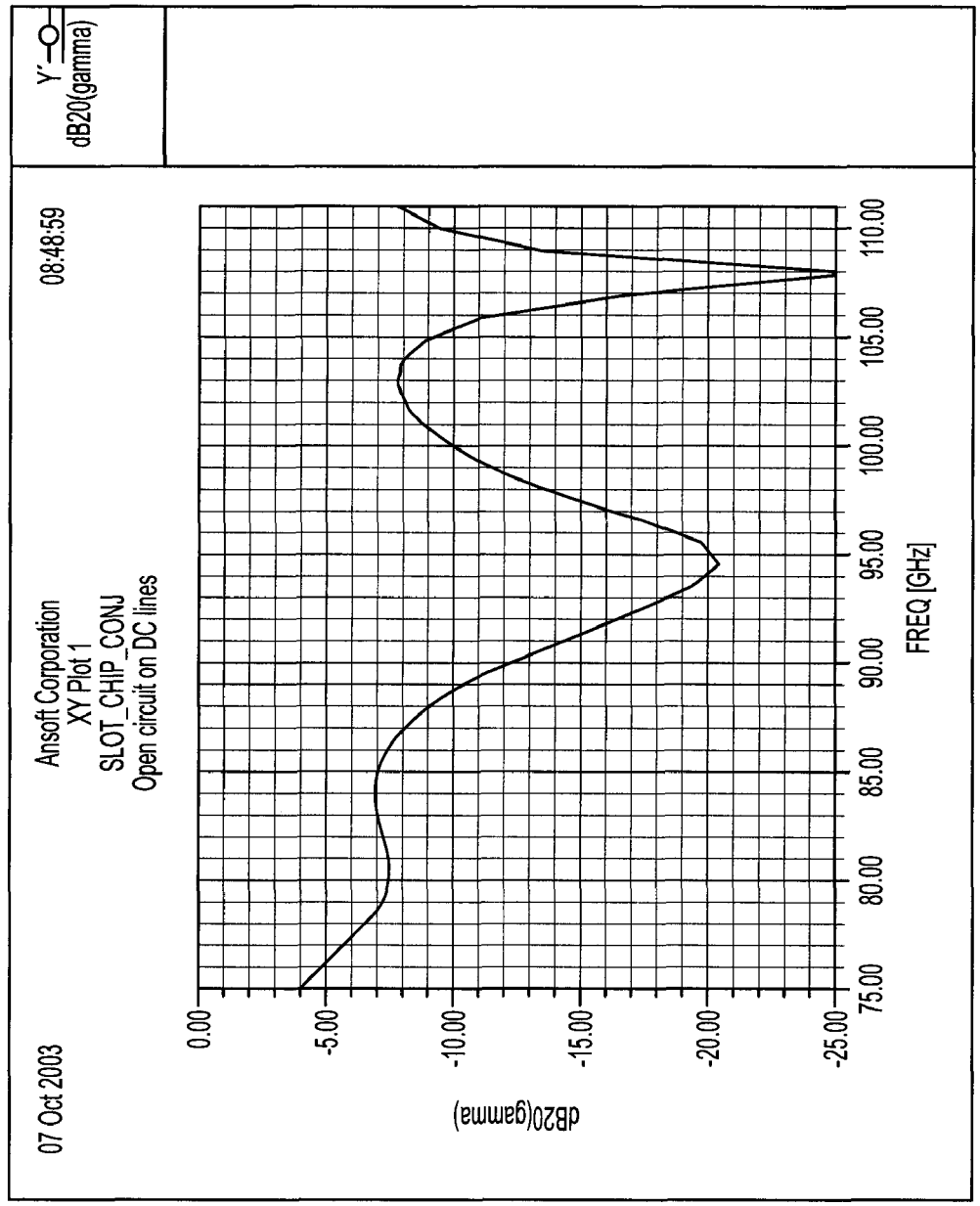
FIGS. 7a and 7b are simulated results of the detector chip antenna, FIG. 7a showing the simulated return loss and FIG. 7b showing the simulated antenna pattern.
Figure 7B:
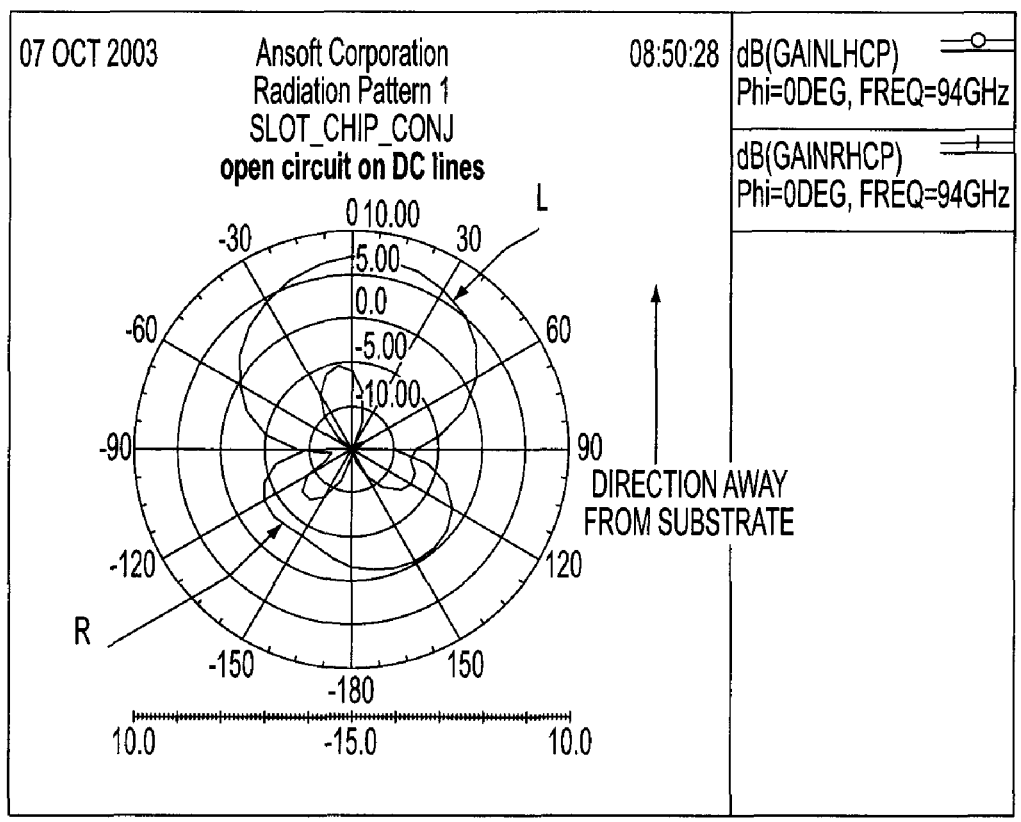

The simulated results of the antenna performance are shown in FIGS. 7a and 7b. As can be seen from FIG. 7a, the return loss is better than 20 dB at 94 GHz. In FIG. 7b two patterns, labeled L and R, show the simulated antenna pattern when designed for left-hand circular polarization and right-hand circular polarization, respectively.

For the particular short circuit location, the antenna was optimized for left-hand circular polarization. If the short were placed on the other side of the diode, the antenna would be optimized for right-hand circular polarization. Simulations with varying loads at the end of the detected signal lines were performed and the resulting variation in the antenna performance was small.

The sphere is preferably mounted in a rigid fashion relative to the cup in order to maintain a fixed distance between the sphere surface and the detectors. This distance can be zero, or there can be a nonzero gap (e.g. 50 mils).

Having described the invention in connection with certain embodiments thereof, modification will now suggest itself to those skilled in the art. As such, the invention is not to be limited to the disclosed embodiment except as is specifically required by the appended claims.

What is claimed is:

1. A method of making a millimeter wave imager comprising:
   forming a single flexible multilayer printed circuit board in a flat configuration with detector chips mounted thereon and with sensor cables attached thereto while the board is flat, and
   folding the single flexible multilayer printed circuit board into a geodesic structure that is placed adjacent and partially around a lens.

2. The method of claim 1 wherein the single flexible multilayer printed circuit board includes a plurality of triangularly shaped elements and a center of each triangularly shaped element of the geodesic structure is at a focal point of the lens.

3. The method of claim 2 wherein a flexible multiple line sensor cable is attached to an exterior surface of a selected triangularly shaped element of the geodesic structure.

4. The method of claim 1 wherein the single flexible multilayer printed circuit board when folded into a geodesic structure is folded around said lens, said lens being formed of a sphere of dielectric material.

5. The method of claim 1 wherein the single flexible multilayer printed circuit board has fold lines which define triangularly shaped regions in said single flexible multilayer printed circuit board.

6. The method of claim 5 wherein at least selected ones of said triangularly shaped regions having an array of detectors disposed thereon, the detectors in said array also being disposed adjacent said lens for receiving and detecting incoming electromagnetic waves delivered via said lens.

7. The method of claim 6 wherein the single flexible multilayer printed circuit board when folded into a geodesic structure is folded around said lens, said lens being formed of a sphere of dielectric material.

8. The method of claim 7 wherein each detector in said array of detectors comprises a chip of a semiconductor material having an integrated diode and an integrated antenna structure formed thereon.

* * * * *